United States Patent Office 3,174,273
Patented Mar. 23, 1965

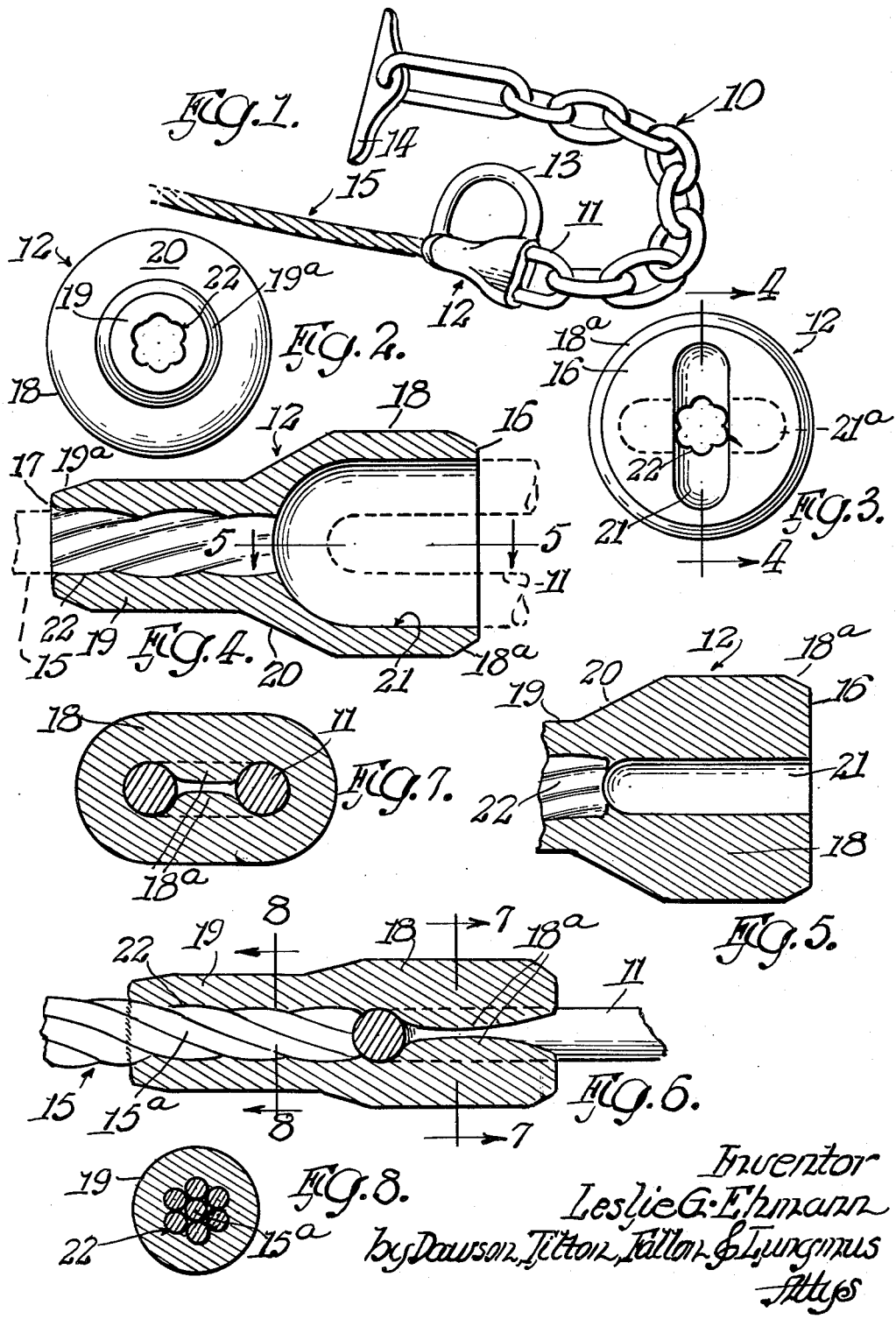

3,174,273
CHAIN FITTING
Leslie G. Ehmann, Portland, Oreg., assignor to Esco Corporation, Portland, Oreg., a corporation of Oregon
Filed Oct. 20, 1961, Ser. No. 146,579
7 Claims. (Cl. 59—93)

This invention relates to a chain fitting, and, more particularly, to a fitting adapted to couple a chain to another elongated member such as a wire rope or another chain.

The invention finds utility, in one embodiment, in conjunction with the storage of logs in log booms on rivers, lakes, etc. A mass of logs making up a log boom is conventionally anchored with a length of wire rope terminating in a chain which fastens onto the bridle on the log raft, with the other end of the rope being equipped with an eye splice connected to a pile, commonly known as a "dolphin." The present practice of connecting the chain to the wire rope employs a fitting on the end of the chain and a loop in the end of the wire rope to pass through the fitting.

This arrangement is subject to a number of drawbacks, including differential wear on the various elements, by cost, and difficulty in manufacture and assembly.

It will be appreciated that differential wear necessarily follows when movement is permitted between the fitting, the chain, and the rope or encircling element. The consequence of premature failure is not only economic—the release of thousands of logs is manifestly dangerous.

The present invention avoids these drawbacks through the provision of a novel fitting of a unitary nature serving to couple, in the environment just described, the chain and wire rope, and the provision of such a fitting constitutes an important object of this invention.

Another object is to provide a fitting which is integrated both into the chain and the other coupling element, such as a wire rope, to provide a connection characterized by absence of relative movement.

Another object is to provide a fitting adapted to receive a substantial portion of a terminal link of a chain and have the link swagingly clamped within the fitting, with the fitting providing means at the other end for receipt of a second elongated member such as the above-mentioned wire rope.

Yet another object is to provide a fitting especially adapted to couple a link chain and wire rope wherein the fitting, before use, is characterized by cylindrical portions at the two ends, the cylindrical portions being swaged about chain and rope to grip these elongated elements tightly with the metal flowing into the irregularities of the elements to yield exceptional holding power.

A further object is to provide a fitting wherein one end is apertured or bored to receive the terminal link of a chain and have the same swaged in place while the other end is equipped with a second bore arranged with spiral grooving conforming to the shape of a wire rope, whereby the wire rope can be threaded into the other bore for subsequent swaging.

Other objects and advantages of the invention may be seen in the details of construction and operation set down in this specification.

The invention will be explained in conjunction with the accompanying drawing, in which—

FIG. 1 is a fragmentary perspective view of the inventive construction in the environment first above described, i.e., adapted to secure a length of wire rope around a dolphin;

FIG. 2 is an end view of a fitting constructed according to the inventive teaching in a condition prior to deformation, i.e., swaging, and further differing from the form seen in FIG. 1 in lacking the "beer mug" handle employed in connection with the particular environment with which the FIG. 1 structure is concerned;

FIG. 3 is an elevational view of the fitting of FIG. 2 but viewed from the opposite end;

FIG. 4 is a sectional view of the device as seen in FIG. 3 and as would be viewed along the sight line 4—4 of FIG. 3, the element adapted to be integrated with the fitting being represented by dashed lines;

FIG. 5 is a cross-sectional view, taken along the line 5—5 of FIG. 4;

FIG. 6 is a view similar to FIG. 5 but with the fitting in a condition after swaging and wherein the coupled elements are included;

FIG. 7 is a sectional view taken along the sight line 7—7 of FIG. 6, being the larger or chain end of the fitting; and FIG. 8 is a sectional view taken along the line 8—8 of FIG. 6 and constitutes a view of the smaller or rope end.

In the illustration given, and with particular reference to FIG. 1, the numeral 10 designates generally a chain which is illustrated here as the well-known "round link" chain, and which is equipped at one end with a terminal link 11 locked within the inventive fitting 12. The fitting 12 seen in FIG. 1 is equipped with a "beer mug" handle 13, and this is adapted to receive an elongated fitting 14 provided at the other end of chain 10, so as to encircle the log raft bridle (not shown). The end of the fitting 12 opposite the end in which the terminal link 11 is received is equipped with a wire rope generally designated 15.

The fitting 12 is seen in larger form and less the beer mug handle 13 in FIG. 4, and is seen to have an enlarged end 16 and a smaller end 17. The larger end 16 is provided by a generally cylindrical portion 18, while the smaller end is provided by a smaller cylindrical portion 19. Interposed between the portions 18 and 19 is an integral shoulder portion 20. The outer walls of the portions 18 and 19 are chamfered or tapered as at 18a and 19a, respectively.

The larger end 16 is equipped with an opening 21 adapted to receive the terminal link 11 of a chain, that link being seen in dotted line. The smaller end 17 of the fitting is equipped with a bore 22 adapted to receive the wire rope 15, which is also seen in dotted line. Additionally, the bore 22 is grooved or "rifled" in a generally spiral fashion so as to accommodate the threadable receipt of the wire rope 15 which has an outer surface characterized by similar grooves.

In the illustration given, it will be noted that the opening 21 is elongated in a direction transverse of the length of the elongated fitting 12, and this can most readily be appreciated by a comparison of FIGS. 3, 4 and 5. There, it will be seen that the opening 21 conforms approximately to about one-half the length of the terminal linkage 11. In some instances it may be desirable to provide the opening 21 with lateral extensions as at 21a (seen only in FIG. 3) to accommodate a portion of the penultimate link of the chain 10.

In operation, the terminal link 11 is inserted within the opening 21 provided in the larger end portion 18 of the fitting 12, and the portion 18 swaged, i.e., circumferentially inwardly deformed, so as to provide the configuration seen in FIGS. 6 and 7. Reference to these views reveals that a portion of the metal provided in the cylindrical portion 18 has flowed into the central opening of the link 11 as at 18a. The metal which is cold worked in this fashion yields exceptional holding power between the chain link 11 and the fitting 12 so as to prevent any relative movement therebetween. This inhibits any differential wear, notwithstanding the fact that different materials of construction are employed in the link 11 and fitting 12. This is in contrast to the prior operations, where the fitting and link may have had different hardnesses, resulting in wear on one element by virtue of abrasion with the harder, associated or coupled element.

Still referring to FIG. 6, but now in connection with FIG. 8, it will be seen that the smaller end 19 has been swaged to a smaller diameter with the compaction of the strands 15a of the wire rope 15, thus resulting in a firm anchorage of the rope 15 within the fitting 12.

The swaging operation provides an advantageous elongation of the element 12, a specific example being about a 16% elongation when a 3" long sleeve fitting 12 is employed. After swaging, the fitting length is of the order of 3½", and such a fitting is adapted to couple 7/16" of iron wire rope and 3/8" round link chain.

It will be noted, particularly from FIG. 6, that the resultant structure has the coupled elements 11 and 15 longitudinally aligned, thereby stressing these elements and the sleeve essentially in tension.

In the fabrication of the fitting, the openings 21 and 22 are advantageously cored during a casting operation, with the material of construction optimally being a stainless alloy steel. The core employed for the opening 22 corresponds to the profile of the wire rope to be inserted therein in a swaging operation. However, it will be appreciated that the inventive fitting may be employed for coupling two chains together, as, for example, roller chain, where linking would be difficult.

While in the foregoing specification a detailed description of an embodiment of the invention has been given for the sake of illustration thereof, many variations in the details herein given may be made by those skilled in the art without departing from the spirit and scope of the invention.

I claim:

1. A fitting for interconnection with a cable chain providing a terminal link and wherein each link has an opening therein for interconnection with an adjacent link, comprising: an elongated unitary metal body, a bore extending into said body at one end thereof, said bore being defined by walls corresponding to the contour of at least about one-half the length of said terminal link so as to overlap and confront at least a portion of said terminal link opening when about one-half of said terminal link is received in said bore, and a second bore extending into the other end of said body, said body about the first-mentioned bore including sufficient metal for displacement of metal into said terminal link opening upon compressive deformation of said body whereby said body is adapted to be immovably clamped to said terminal link.

2. A fitting for interconnection with a cable chain providing a terminal link and wherein each link has an opening therein for interconnection with an adjacent link, comprising: an elongated unitary cylindrical metal body, said body having ends of different diameters, a bore extending into said body at one end thereof, said bore being defined by walls corresponding to the contour of at least about one-half the length of said terminal link so as to overlap and confront at least a portion of said terminal link opening when about one-half of said terminal link is received in said bore, and a second bore extending into the other end of said body, said body about the first-mentioned bore including sufficient metal for displacement of metal into said terminal link opening upon compressive deformation of said body whereby said body is adapted to be immovably clamped to said terminal link.

3. A fitting for interconnection with a cable chain providing a terminal link and wherein each link has an opening therein for interconnection with an adjacent link, comprising: an elongated unitary cylindrical metal body, said body having ends of different diameters, a bore extending into said body at one end thereof, said bore being defined by walls corresponding to the contour of at least about one-half the length of said terminal link so as to overlap and confront at least a portion of said terminal link opening when about one-half of said terminal link is received in said bore, and a second bore extending into the other end of said body, said body about the first-mentioned bore including sufficient metal for displacement of metal into said terminal link opening upon compressive deformation of said body whereby said body is adapted to be immovably clamped to said terminal link, said first-mentioned bore being generally elongated transversely of the length of said body so as to accommodate a terminal link having a greater width than thickness.

4. A connective assembly for a cable chain having a terminal link, comprising a fitting including a unitary elongated metal body defining opposed ends, a bore in one of said ends and having a contour prior to deformation conforming to a portion of said terminal link, each of the links of said chain having a recess for coupling to an adjacent link, said terminal link being partially received in said bore with portions of said body clampingly and immovably related thereto and positioned within the recess of said terminal link to dispose a portion of said terminal link exteriorly of said one end in coupling relation with another link, a bore in the other end of said body, and an elongated coupling member clampingly and immovably received in said other end bore.

5. The structure of claim 4 in which said elongated coupling member is a wire rope.

6. The structure of claim 4 in which the received portion of said terminal link is about one-half the length of said terminal link.

7. For a chain having circular links, one of which is a terminal link, a fitting comprising a unitary elongated body defining opposite ends, a bore in one of said ends having a contour prior to swaging conforming to a portion of said terminal link, said terminal link having a central opening, said body, adjacent said one end, being in clamping and immovable relation with said terminal link, with portions of said body extending into said terminal link opening, and a bore in said body at the other of said ends, said other end opening having a wire rope immovably clamped therein.

References Cited by the Examiner

UNITED STATES PATENTS

| | | | |
|---|---|---|---|
| 313,325 | 3/85 | Hansen | 254—127 |
| 646,823 | 4/00 | Gavis | 16—122 |
| 878,739 | 2/08 | Newman | 24—116 |
| 1,079,907 | 11/13 | Weed | 152—243 |
| 1,119,572 | 12/14 | Butler | 64—2 |
| 1,433,123 | 10/22 | Corey | 29—437 |
| 2,620,550 | 12/52 | Granborg et al. | 24—123 XR |
| 2,832,118 | 4/58 | Ehmann | 24—123 |
| 3,033,010 | 5/62 | Pintarelli | 29—437 |

FOREIGN PATENTS 190,525 12/22 Great Britain.

WILLIAM J. STEPHENSON, Primary Examiner.

CARL W. TOMLIN, Examiner.